(12) United States Patent
Nishidate

(10) Patent No.: US 10,886,824 B2
(45) Date of Patent: Jan. 5, 2021

(54) MOTOR AND ACTUATOR UNIT

(71) Applicant: Tokyo Parts Industrial Co., Ltd., Gunma-ken (JP)

(72) Inventor: Masahiro Nishidate, Gunma-ken (JP)

(73) Assignee: Tokyo Parts Industrial Co., Ltd.

( * ) Notice: Subject to any disclaimer, the term of this patent is extended or adjusted under 35 U.S.C. 154(b) by 211 days.

(21) Appl. No.: 16/162,544

(22) Filed: Oct. 17, 2018

(65) Prior Publication Data
US 2019/0181732 A1 Jun. 13, 2019

(30) Foreign Application Priority Data
Dec. 12, 2017 (JP) .................. 2017-237356

(51) Int. Cl.
| | |
|---|---|
| H02K 15/03 | (2006.01) |
| H02K 7/116 | (2006.01) |
| H02K 7/08 | (2006.01) |
| H02K 7/00 | (2006.01) |
| H02K 1/27 | (2006.01) |
| H02K 1/30 | (2006.01) |
| H02K 5/167 | (2006.01) |
| B60K 11/08 | (2006.01) |

(52) U.S. Cl.
CPC ........... *H02K 15/03* (2013.01); *H02K 1/2733* (2013.01); *H02K 1/30* (2013.01); *H02K 5/1677* (2013.01); *H02K 7/003* (2013.01); *H02K 7/083* (2013.01); *H02K 7/086* (2013.01); *H02K 7/116* (2013.01); *B60K 11/085* (2013.01)

(58) Field of Classification Search
CPC ........ H02K 15/03; H02K 1/30; H02K 5/1677; H02K 7/003; H02K 7/083; H02K 7/086; H02K 7/116; H02K 1/28; H02K 1/2733; B60K 11/085
USPC .................................................. 310/156.08
See application file for complete search history.

(56) References Cited

U.S. PATENT DOCUMENTS

| | | | | |
|---|---|---|---|---|
| 7,394,174 B2 * | 7/2008 | Blase | ..................... | F02M 37/08 |
| | | | | 310/156.05 |
| 2002/0158535 A1 * | 10/2002 | Maul | ..................... | H02K 1/278 |
| | | | | 310/156.08 |
| 2014/0175929 A1 * | 6/2014 | Horng | .................. | H02K 1/2733 |
| | | | | 310/156.08 |
| 2019/0020235 A1 * | 1/2019 | Horng | ..................... | H02K 15/03 |

FOREIGN PATENT DOCUMENTS

| | | |
|---|---|---|
| JP | 2001028853 A | 1/2001 |
| JP | 2015524244 A | 8/2015 |

* cited by examiner

*Primary Examiner* — Forrest M Phillips
(74) *Attorney, Agent, or Firm* — Jordan and Koda, PLLC

(57) ABSTRACT

A motor comprises: a shaft; a permanent magnet rotor in which a permanent magnet and a gear member 32 are united; and a stator, arranged facing the permanent magnet. The gear member 32 has a pinion 33 and a mounting part 34. The mounting part 34 has: a circumferential-direction constraining part 34*a*, which constrains the circumferential movement of the permanent magnet; axial-direction constraining parts 34*b*, 34*c*, which abut both the top and bottom surfaces of the permanent magnet, so as to constrain the axial movement of the permanent magnet; and a plurality of elastic pieces 34*d* that apply a radially outward biasing force to the inner peripheral face of the permanent magnet.

14 Claims, 8 Drawing Sheets

MOTOR AND ACTUATOR UNIT

BACKGROUND OF THE INVENTION

The present invention relates to a motor having a permanent magnet rotor, and to an actuator unit provided with the same.

Actuators are known which, for example, automatically open and close grille shutters, in order to feed in air around an engine or a radiator for cooling, and to release hot air inside the hood, in accordance with the travelling state of a vehicle and the warming state of the engine.

In terms of such actuators, for example, Japanese Patent Laid-Open Publication No. 2015-524244 discloses a grille shutter drive device including: motor unit, which generates a drive force that drives a grille shutter, a control unit, which controls the generation of the drive force of the motor unit; and a coupling unit, which applies the drive force of the motor unit to the grille shutter. In this grille shutter drive device, a permanent magnet rotor is used, in which a permanent magnet is disposed on the outer peripheral face of a member provided with a rotary gear.

Furthermore, Japanese Patent Laid-Open Publication No. 2001-28853 discloses a permanent magnet rotor having a core part provided with an output gear and a ring magnet, this core part being inserted into the ring magnet and united therewith by a coupling means. In terms of the coupling means for this permanent magnet rotor, a flange and a locking claw are provided at the two ends of the core part so as to constrain the movement of the ring magnet in the axial direction, and a separate claw that is provided on the core part fits with notches provided in the ring magnet, whereby the movement of the ring magnet in the circumferential direction is constrained.

However, the structure of the permanent magnet rotor described in Japanese Patent Laid-Open Publication No. 2015-524244 does not allow the member provided with the rotary gear to constrain the permanent magnet in the axial direction. Therefore, in order to constrain the movement of the permanent magnet in the axial direction, an adhesive or the like must be separately used, which not only increases the number of work steps during assembly, but also presents a problem in that the reliability of fixation with an adhesive is low.

Meanwhile, in the permanent magnet rotor described in Japanese Patent Laid-Open Publication No. 2001-28853, it may be possible to constrain the permanent magnet in the axial direction and the circumferential direction without using an adhesive. However, there is a problem in that one side of the ring magnet is locally cut away for the purposes of constraining the movement of the ring magnet in the circumferential direction, which detracts from the symmetry of magnetization of the ring magnet, and adversely affects the rotational drive force. Furthermore, although the locking claw that locks on one side of the ring magnet in the axial direction is arranged at the forward end of a flexible cantilevered beam, by way of a slit provided in the core, this cantilevered beam does not have a structure capable of imparting a biasing force to the ring magnet in the radially outward direction. Therefore, there is likely to be play between the ring magnet and the core, due to the dimensional tolerances of the ring magnet and the core, and as a result, it is likely that fixation with adhesive will be necessary.

SUMMARY OF THE INVENTION

One or more embodiments of the present invention realize a geared permanent magnet rotor, with which the permanent magnet can easily and reliably be constrained in the axial direction and the circumferential direction, while maintaining the symmetry of magnetization of the permanent magnet, and provide a motor and an actuator unit incorporating the permanent magnet rotor.

Note that, in the aspects described below, the constituent elements employed can be used in the most freely chosen combinations possible. Furthermore, the aspects and technical features of the present invention are not limited to those described hereafter, and are to be understood based on the description in the entire specification and the drawings, or based on the inventive ideas that can be grasped by the skilled artisan based on these descriptions.

In a first aspect of the present invention relating to the motor, the motor comprises: a shaft; a permanent magnet rotor in which a permanent magnet and a gear member are united; and a stator, arranged facing the permanent magnet, the permanent magnet has a cylindrical outer peripheral face and a regular polygonal prismatic inner peripheral face, the gear member has: a center hole through which the shaft is inserted; a pinion positioned in an axially upper part of the shaft; and a mounting part positioned in an axially lower part of the shaft, the mounting part has: a circumferential-direction constraining part, which is in close contact with a portion of the inner peripheral face of the permanent magnet, so as to constrain the movement of the permanent magnet in the circumferential direction; axial-direction constraining parts, which abut both the top and bottom surfaces of the permanent magnet, so as to constrain the movement of the permanent magnet in the axial direction; and elastic pieces that apply a radially outward biasing force against the inner peripheral face of the permanent magnet.

In a second aspect of the present invention relating to the motor, the motor comprises: a shaft; a permanent magnet rotor in which a permanent magnet and a gear member are united; and a stator, arranged facing the permanent magnet, the permanent magnet has a cylindrical outer peripheral face and a regular polygonal prismatic inner peripheral face, wherein N poles and S poles are alternately magnetized in the circumferential direction and the boundaries between the magnetic poles correspond to the corners of the regular polygonal prism, the gear member has: a center hole through which the shaft is inserted; a pinion positioned in an axially upper part of the shaft; and a mounting part positioned in an axially lower part of the shaft, the mounting part has: a circumferential-direction constraining part, which is in close contact with a portion of the inner peripheral face of the permanent magnet, so as to constrain the movement of the permanent magnet in the circumferential direction; axial-direction constraining parts, which abut both the top and bottom surfaces of the permanent magnet, so as to constrain the movement of the permanent magnet in the axial direction; and elastic pieces that apply a radially outward biasing force against the inner peripheral face of the permanent magnet, and among the axial-direction constraining parts, one of the upper constraining part that constrains the top surface of the permanent magnet and the lower constraining part that constrains the bottom surface of the permanent magnet is provided continuous with an end of an elastic piece.

In a third aspect of the present invention relating to an actuator unit, in which a motor and a speed reduction mechanism are housed in a case, the motor comprises: a shaft; a permanent magnet rotor in which a permanent magnet and a gear member are united; and a stator, arranged facing the permanent magnet, the permanent magnet has a cylindrical outer peripheral face and a regular polygonal prismatic inner peripheral face, the gear member has: a center hole through which the shaft is inserted; a pinion positioned in an axially upper part of the shaft; and a mounting part positioned in an axially lower part of the shaft, the mounting part has: a circumferential-direction constraining part, which is in close contact with a portion of the inner peripheral face of the permanent magnet, so as to constrain the movement of the permanent magnet in the circumferential direction; axial-direction constraining parts, which abut both the top and bottom surfaces of the permanent magnet, so as to constrain the movement of the permanent magnet in the axial direction; and elastic pieces that apply a radially outward biasing force to the inner peripheral face of the permanent magnet, and the speed reduction mechanism reduces the speed of the rotation of the pinion.

DETAILED DESCRIPTION OF THE PREFERRED EMBODIMENTS

Figure 1:
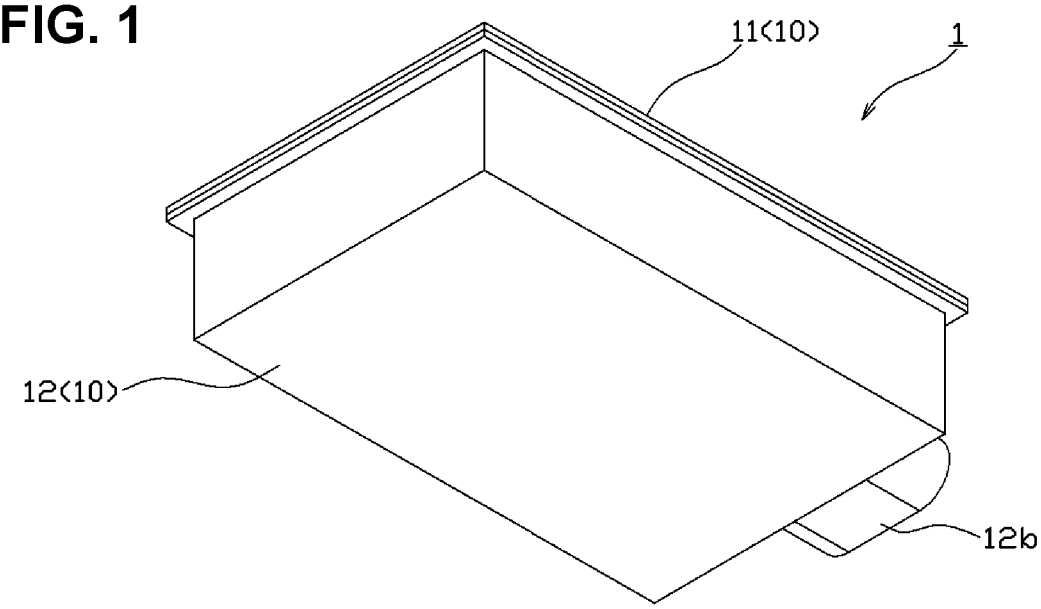
FIG. 1 is a perspective view of the actuator unit according to a first exemplary mode of embodiment of the present invention, as viewed from the lower case side.

In the present specification, in terms of the upward and downward directions, the pinion-side of the gear member is described as the axially upper part, and the mounting-part side thereof is described as the axially lower part, but this description is a matter of convenience and, when this is used, upper and lower may be reversed, or these parts may be to the right and left. Accordingly, in the following exemplary mode of embodiment, for example, the upper case could be referred to as the lower case and the lower case could be referred to as the upper case.

First Exemplary Mode of Embodiment

A first exemplary mode of embodiment of the present invention will be described with reference to FIGS. 1 to 12.

The actuator unit 1 in this example can, for example, be used as a drive source for a vehicle grille shutter device, and principally comprises a case 10, a motor 20, and a speed reduction mechanism 60.

The case 10 is formed in the shape of a box having an internal space, by assembling an upper case 11 and a lower case 12 with each other, which are formed from a synthetic resin such as a reinforced plastic. The motor 20 and the speed reduction mechanism 60 are housed in the inner space of the case 10. The upper case 11 is provided with an opening (not shown) for exposing a subsequently described output shaft 65, to the exterior of the case, and the lower case 12 is provided with a connector 12b so as to be able to plug in a plug that provides an electrical connection with the outside.

The motor 20 is a so-called brushless motor, and comprises a permanent magnet rotor 30 and a stator 40, arranged facing the outer peripheral face of the permanent magnet rotor 30 with a predetermined gap therebetween.

The permanent magnet rotor 30 comprises a permanent magnet 31 made of a magnetic material and a gear member 32 made of an integrally molded resin, which are assembled so as to be united. The permanent magnet 31 has a cylindrical outer peripheral face 31a and a regular hexagonal prismatic inner peripheral face 31b, and the centers of the outer peripheral face 31a and the inner peripheral face 31b coincide. In this permanent magnet 31, six poles are alternately magnetized as N poles and S poles in the circumferential direction, and the boundaries between the magnetic poles correspond to the corners of the regular hexagon. By causing the boundaries of the magnetic poles to correspond to the corners of the regular hexagon as described above, it is possible to reduce cogging torque, noise, and vibration, by eliminating sudden changes in surface magnetic flux. Note that there are no particular limitations on the number of poles in the permanent magnet 31, and this can be changed as appropriate, depending on the configuration of the stator 40 and the like. In this case, in conjunction with changing the number of poles, it is preferable that the inner peripheral face 31b of the permanent magnet 31 is formed in the shape of a regular polygonal prism corresponding to that number of poles.

The gear member 32 has a center hole 35, through which a shaft 50 (see FIG. 12) is inserted, a pinion 33, positioned in an axially upper part of the shaft 50, and a mounting part 34, positioned in an axially lower part of the shaft 50. The pinion 33 transmits the rotational drive force of the motor 20 to the speed reduction mechanism 60, and is engaged with a speed reduction gear 61 in the speed reduction mechanism 60. The mounting part 34 is a part serving to unite the permanent magnet 31 and the gear member 32, and has a circumferential-direction constraining part 34a, an upper axial-direction constraining part 34b, a lower axial-direction constraining part 34c, and elastic pieces 34d.

The circumferential-direction constraining part 34a is in close contact with a portion of the inner peripheral face 31b of the permanent magnet 31 so as to constrain the movement of the permanent magnet 31 in the circumferential direction. The circumferential-direction constraining part 34a in this example has an axial length equal to the axial length of the permanent magnet 31, and the radial apex angles thereof are 120°, which are the same as those of the corners of the inner peripheral face 31b of the permanent magnet 31, such that this is pressed against two surfaces, which are respectively adjacent to two facing corners (P1 and P2 in FIG. 11) of the inner peripheral face 31b of the permanent magnet 31. Note that, the circumferential-direction constraining part 34a can be pressed against the entire inner peripheral face of the permanent magnet 31 or any arbitrary portions thereof, as long as a state can be produced in which this is capable of constraining the movement of the permanent magnet in the circumferential direction. Furthermore, there is no particular limitation on the axial length of the circumferential-direction constraining part 34a, but in consideration of the reliability of constraint of the permanent magnet 31, it is preferable that be in the range of 0.5 to 1.0 times, and particularly preferably within the range of 0.8 to 1.0 times the axial length of the permanent magnet 31.

The upper axial-direction constraining part 34b and the lower axial-direction constraining part 34c respectively abut the top surface and the bottom surface of the permanent magnet 31, and constrain the movement of the permanent magnet 31 in the axial direction. The upper axial-direction constraining part 34b in this example is comprises two flange-shaped protruding parts at the upper end of the circumferential-direction constraining part 34a, so that the lower surfaces of the two protruding parts abut the top surface of the permanent magnet 31. The lower axial-direction constraining part 34c in this example consists of claw-shaped locking claws provided at the lower ends of two downwardly extending flat springs 34c1, and these two locking claws abut the bottom surface of the permanent magnet 31.

The elastic pieces 34d apply a radially outward biasing force to the inner peripheral face 31b of the permanent magnet 31. The elastic pieces 34d in this example are formed in the shape of flaps (movable wing pieces) on each of the left and right sides of an axially upward extending portion of the flat spring 34c1. When the elastic pieces 34d are arranged in the space between the inner peripheral face 31b of the permanent magnet 31 and the circumferential-direction constraining part 34a, they abut the inner peripheral face 31b of the permanent magnet 31 and are elastically deformed, whereby a radially outward biasing force can be applied to the inner peripheral face 31b. There are no particular limitations on the axial length of the elastic pieces 34d, but so as to stably hold the permanent magnet 31, in the range of 0.5 to 1.0 times, and particularly preferably in the range of 0.8 to 1.0 times the axial length of the permanent magnet 31 is particularly preferred.

In concrete terms, the assembly of the gear member 32 on the permanent magnet 31 can be performed as follows.

(1) First, in a state in which the two corners P1, P2 of the inner peripheral face 31b of the permanent magnet 31 and the two corners of the circumferential-direction constraining part 34a are aligned in the circumferential direction, the lower axial-direction constraining part 34c is inserted from above the permanent magnet 31, following the inner peripheral face 31b. Inclined surfaces 34c2 are provided at the lower ends of the locking claws of the lower axial-direction constraining part 34c, and locking claws are provided at the ends of the flat springs 34c1, whereby the flat springs 34c1 are slightly inwardly deformed in conjunction with insertion, such that the lower axial-direction constraining part 34c can begin to be smoothly inserted into the permanent magnet 31 at this time.

(2) When the gear member 32 is further inserted, the lower end of the circumferential-direction constraining part 34a is inserted inside the permanent magnet 31, and the permanent magnet 31 is constrained in the circumferential direction.

(3) When the gear member 32 is further inserted, the lower ends of the elastic pieces 34d, which are slightly deformed inward along with the flat spring 34c1, are inserted inside the permanent magnet 31.

(4) When the gear member 32 is further inserted, the elastic pieces 34d abut against the inner peripheral face 31b of the permanent magnet 31 and are elastically deformed, so as to apply a radially outward biasing force to the inner peripheral face 31b of the permanent magnet 31.

(5) When the gear member 32 is further inserted, the lower surface of the upper axial-direction constraining part 34b abuts the top surface of the permanent magnet 31, while the lower axial-direction constraining parts 34c come out of the inner peripheral face 31b of the permanent magnet 31 and abut the bottom surface of the permanent magnet 31, thereby completing the assembly.

Figure 2:
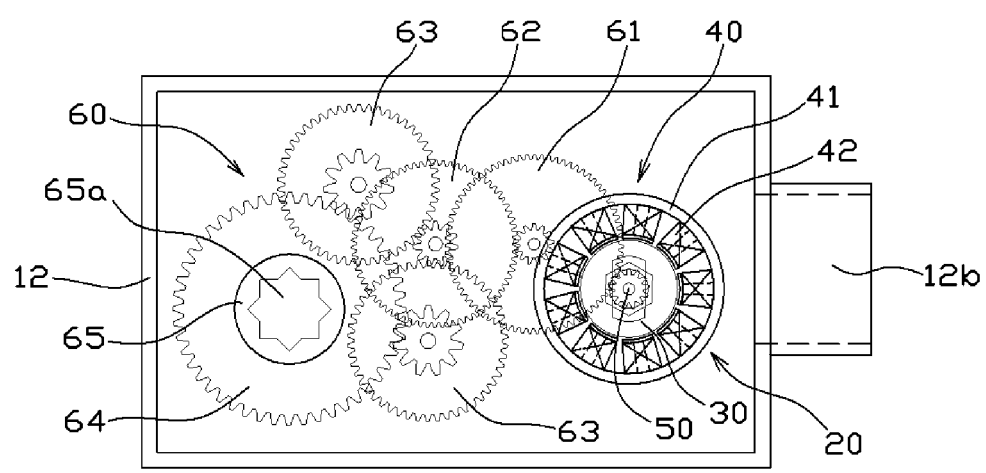
FIG. 2 is a top view, schematically illustrating the state in which the upper case of the actuator unit in FIG. 1 has been removed.
Figure 3:
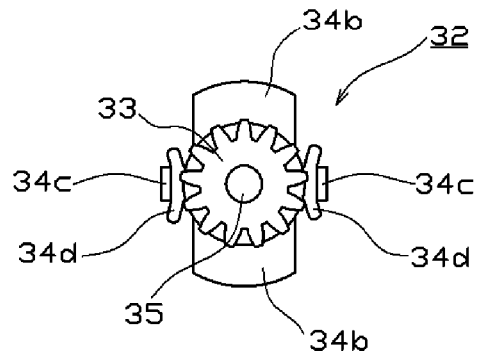
FIG. 3 is a top view of a gear member of the motor according to the first exemplary mode of embodiment of the present invention.
Figure 4:
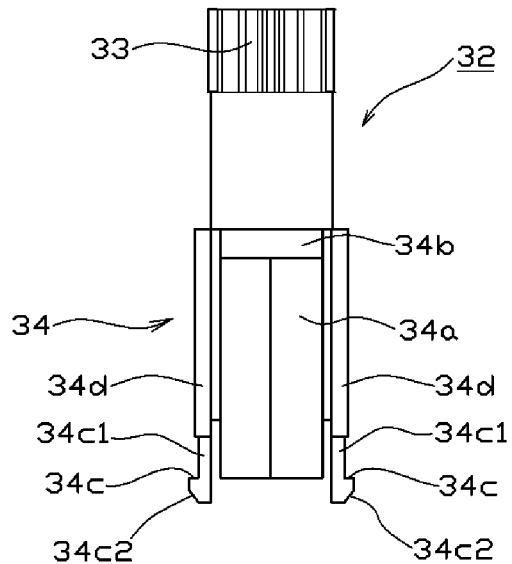
FIG. 4 is a front view of the gear member in FIG. 3.
Figure 5:
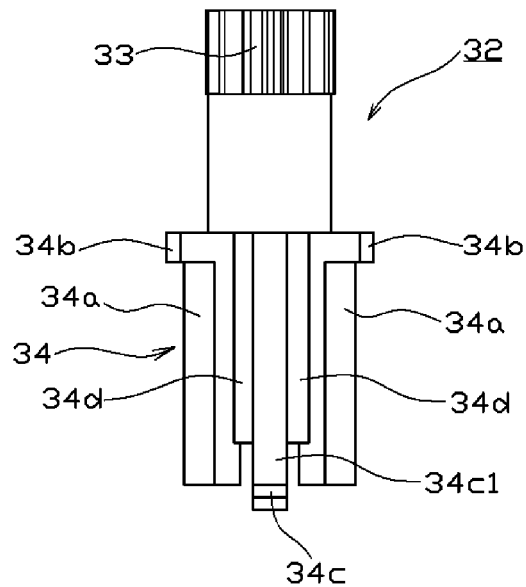
FIG. 5 is a right side view of the gear member in FIG. 3.
Figure 6:
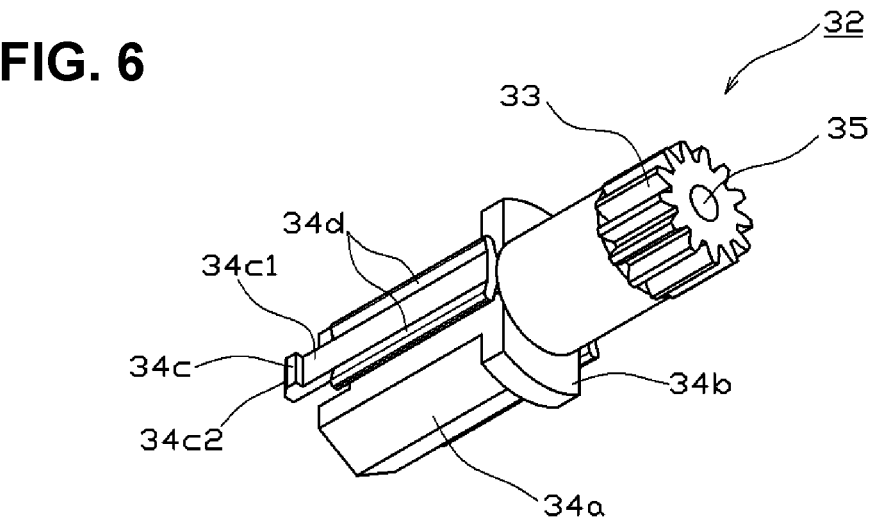
FIG. 6 is a perspective view of the gear member in FIG. 3.
Figure 7:
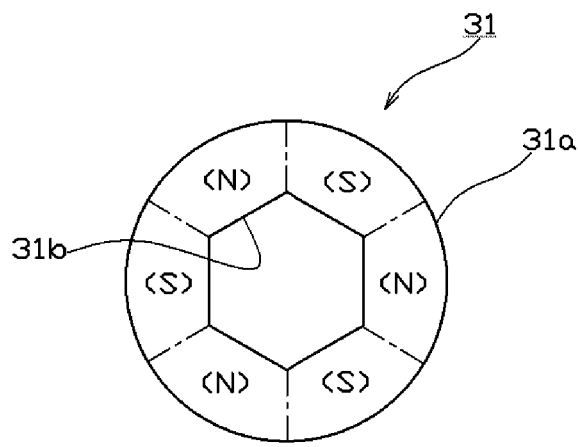
FIG. 7 is a top view of a permanent magnet in the motor according to the first exemplary mode of embodiment of the present invention.
Figure 8:
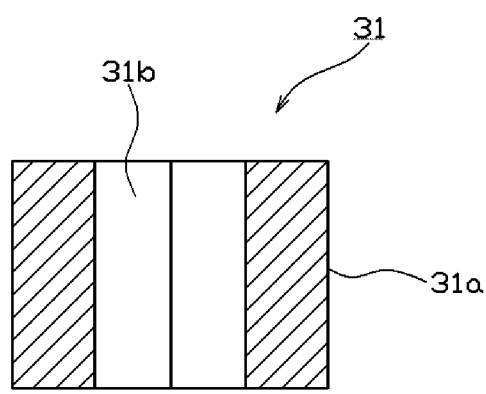
FIG. 8 is a longitudinal cross-sectional view of the permanent magnet in FIG. 7.
Figure 9:
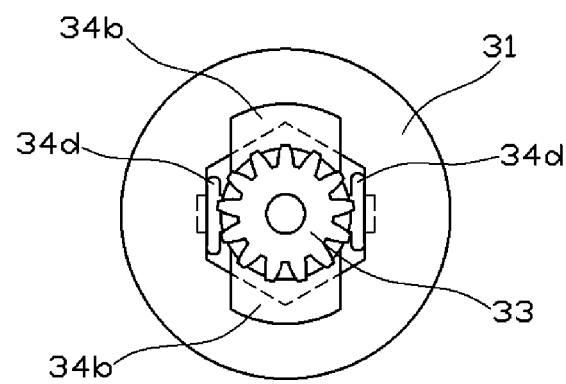
FIG. 9 is a top view of the permanent magnet rotor of the motor according to the first exemplary mode of embodiment of the present invention.
Figure 10:
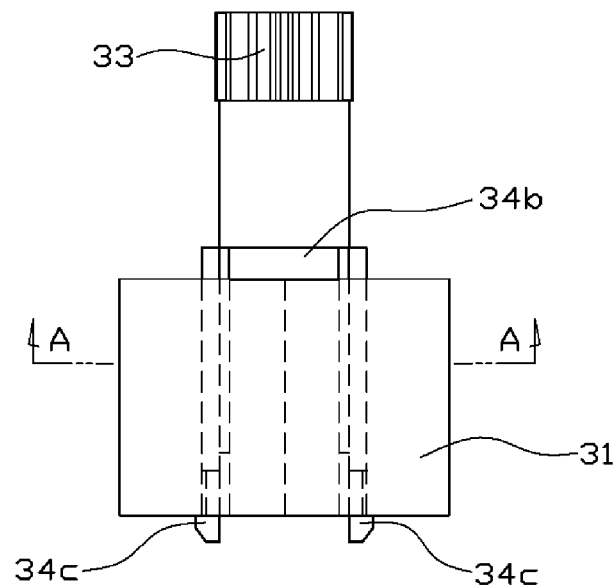
FIG. 10 is a front view of the permanent magnet rotor in FIG. 9.
Figure 11:
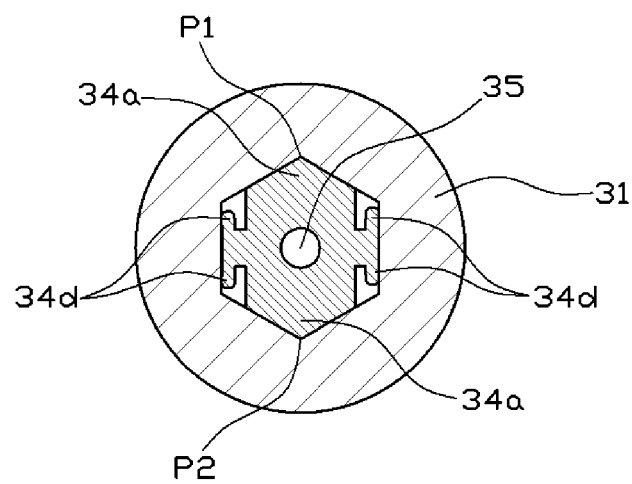
FIG. 11 is a cross-sectional view at A-A in FIG. 10.
Figure 12:
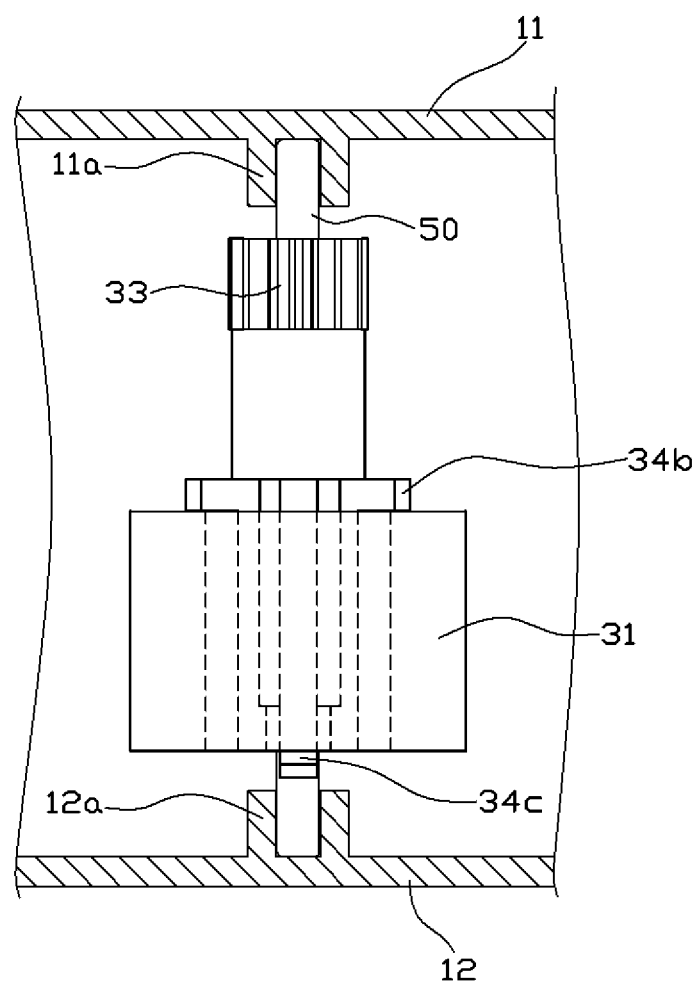
FIG. 12 is a view serving to describe the manner in which the permanent magnet rotor is supported in the actuator unit according to the first exemplary mode of embodiment of the present invention.

The stator 40 has a stator core 41 having a plurality of winding teeth on the inside of an annular shape, and a coil 42 wound around the winding teeth, the stator 40 being fixed in the case 10. The permanent magnet rotor 30 is disposed inside the stator 40, as shown in FIG. 2, and the shaft 50 is inserted through the center hole 35.

The shaft 50 in this example is a non-rotating stationary shaft, and the upper and lower ends of the shaft 50 are respectively supported and fixed by an upper bearing 11a, which is integrally formed with the upper case 11, and a lower bearing 12a, which is integrally formed with the lower case 12. The permanent magnet rotor 30 is held at a predetermined height by magnetic attractive force between the permanent magnet 31 and the stator core 41 and rotates in a predetermined direction around the shaft 50 by way of selective energization to the coil 42.

The speed reduction mechanism 60 has reduction gears 61, 62, 63, an output gear 64, and an output shaft 65. The speed of the rotational drive force of the pinion 33 on the permanent magnet rotor 30 is sequentially reduced by the speed reduction gears 61, 62, 63 and the output gear 64. A mounting hole 65a, to which a lever or the like can be mounted, is provided on an output shaft 65, which is united with the output gear 64, and by turning the non-illustrated lever or the like, which has been mounted in the mounting hole 65a, a grille shutter or the like can be opened and closed. Note that, a control board (not illustrated) for controlling the drive of the motor 20 is arranged in the case 10.

According to the present mode of embodiment, which has been described above, in the permanent magnet rotor 30, the permanent magnet 31 is constrained in both the circumferential direction and the axial direction by the gear member 32, and a radially outward biasing force is applied to the inner peripheral face 31*b* of the permanent magnet 31 by a total of four elastic pieces 34*d*. Therefore, play between the permanent magnet 31 and the gear member 32 can be prevented and, as a result, fixation with an adhesive is not required.

Furthermore, the circumferential-direction constraining part 34*a* of the gear member 32 is pressed against the two surfaces, which are respectively adjacent to the facing two corners of the inner peripheral face 31*b* of the permanent magnet 31, and the elastic pieces 34*d* are arranged in the space between the inner peripheral face 31*b* of the permanent magnet 31 and the circumferential-direction constraining part 34*a*, whereby the permanent magnet 31 can be held in an extremely well-balanced manner.

Furthermore, by causing the inner peripheral face of the permanent magnet 31 to have a polygonal shape, movement in the circumferential direction of the permanent magnet can be easily constrained without providing recesses at the end of the permanent magnet as was conventional, and thus the symmetry of magnetization of the permanent magnet can be maintained.

Consequently, the motor 20 and the actuator unit 1 of the present example have excellent reliability and drive characteristics and are easy to manufacture.

Second Exemplary Mode of Embodiment

Figure 13:
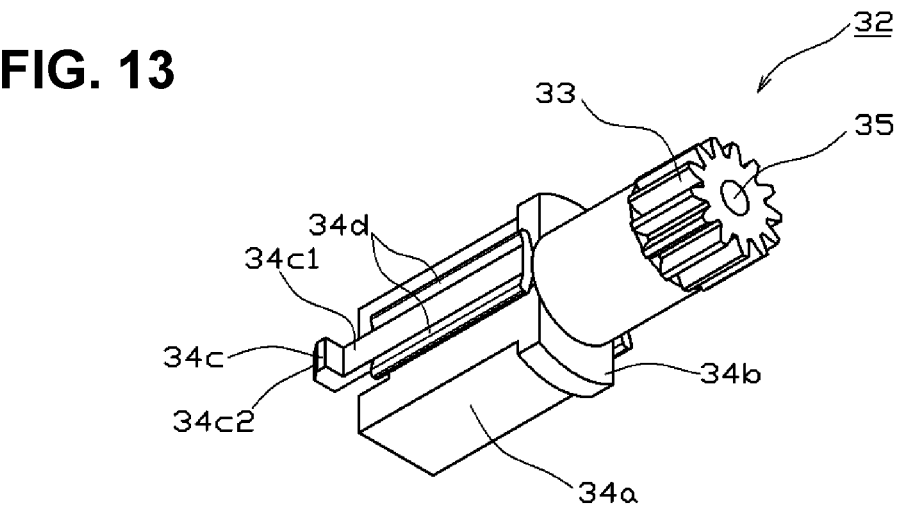
FIG. 13 is a perspective view of a gear member in a motor according to a second exemplary mode of embodiment of the present invention.
Figure 14:
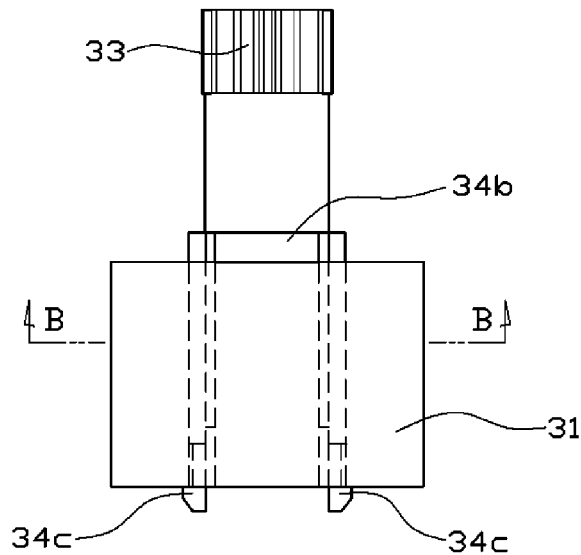
FIG. 14 is a front view of a permanent magnet rotor in a motor according to the second exemplary mode of embodiment of the present invention.
Figure 15:
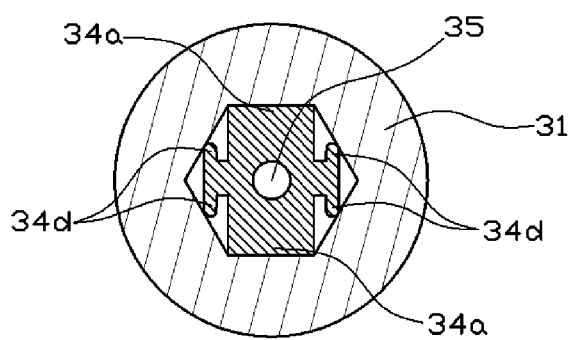
FIG. 15 is a cross-sectional view at B-B in FIG. 14.

A second exemplary mode of embodiment of the present invention will be described with reference to FIGS. 13 to 15. Note that, in these figures, constituent parts that are the same as in the first exemplary mode of embodiment are given the same reference numerals, and redundant description thereof is forgone. In this example, the major difference from the first exemplary mode of embodiment is the structure for the circumferential constraint of the permanent magnet 31 by the gear member 32. Specifically, in the first exemplary mode of embodiment, the circumferential-direction constraining part 34*a* of the gear member 32 is pressed against four surfaces at the inner periphery of the permanent magnet 31 but, in this example, it is pressed against two surfaces.

In the gear member 32 in this example, the circumferential-direction constraining parts 34*a* are such that a flat surface is formed having the same size as the flat surfaces of the inner peripheral face 31*b* of the permanent magnet 31, and two circumferential-direction constraining parts 34*a* are pressed against two facing surfaces of the inner peripheral face 31*b* of the permanent magnet 31. Note that, the elastic pieces 34*d* are arranged in the space provided between the inner peripheral face 31*b* of the permanent magnet 31 and the circumferential-direction constraining parts 34*a*, in the same manner as in the first exemplary mode of embodiment. In this example, the same effect is produced as in of the first exemplary mode of embodiment.

Third Exemplary Mode of Embodiment

Figure 16:
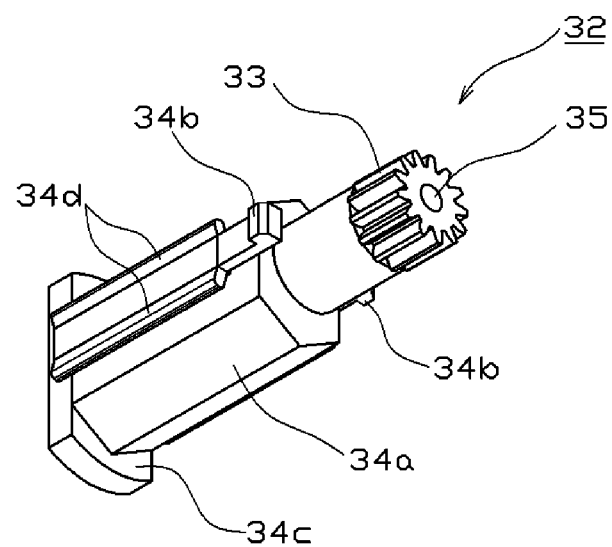
FIG. 16 is a perspective view of a gear member in a motor according to a third exemplary mode of embodiment of the present invention.
Figure 17:
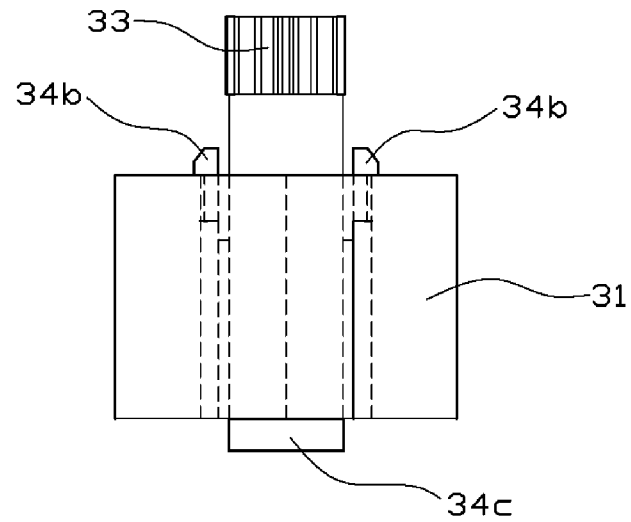
FIG. 17 is a front view of a permanent magnet rotor in a motor according to the third exemplary mode of embodiment of the present invention.

A third exemplary mode of embodiment of the present invention will be described with reference to FIGS. 16 and 17. Note that, in these figures, constituent parts that are the same as in the first exemplary mode of embodiment are given the same reference numerals, and redundant description thereof is forgone. In this example, the major difference from the first exemplary mode of embodiment is the structure for the axial-direction constraint of the permanent magnet 31 by the gear member 32. Specifically, in the first exemplary mode of embodiment, the upper axial-direction constraining part 34*b* is formed in the shape of flanges, and locking claws are used for the lower axial-direction constraining part 34*c* but, in this example, locking claws are used for the upper axial-direction constraining part 34*b* and the lower axial-direction constraining part 34*c* are formed in the shape of flanges.

In this example, because the lower axial-direction constraining part 34*c* is formed in the shape of flanges, the gear member 32 is attached to the permanent magnet 31 by inserting the pinion 33 side first, from the lower side of the permanent magnet 31. At this time, the diameter of the pinion 33 is slightly smaller, so that a space is formed behind the locking claws, so that the locking claws of the upper axial-direction constraining parts 34*b* can be inserted smoothly. Note that the elastic pieces 34*d* are arranged in the space provided between the inner peripheral face 31*b* of the permanent magnet 31 and the circumferential-direction constraining parts 34*a*, in the same manner as in the first exemplary mode of embodiment. In this example, the same effect is produced as in of the first exemplary mode of embodiment.

Fourth Exemplary Mode of Embodiment

Figure 18:
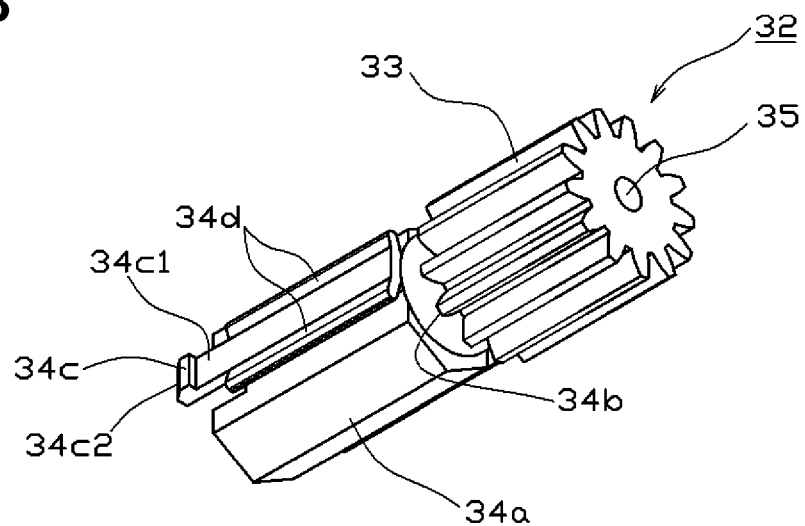
FIG. 18 is a perspective view of a gear member in a motor according to a fourth exemplary mode of embodiment of the present invention.
Figure 19:
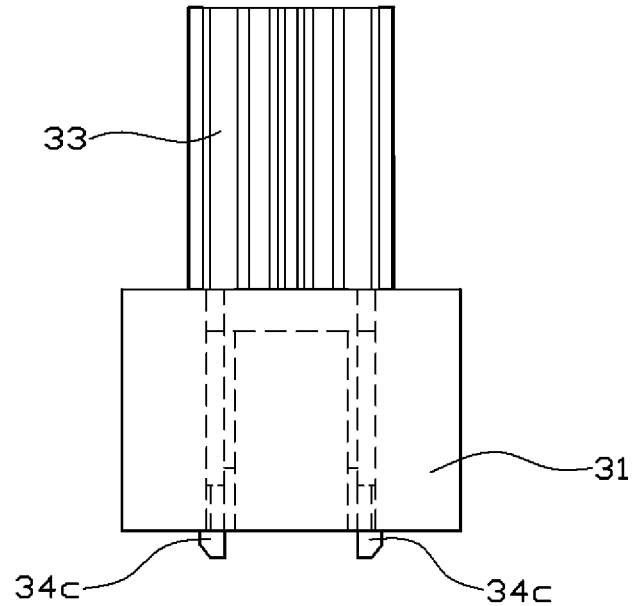
FIG. 19 is a front view of a permanent magnet rotor in a motor according to the fourth exemplary mode of embodiment of the present invention.

A fourth exemplary mode of embodiment of the present invention will be described with reference to FIGS. 18 and 19. Note that, in these figures, constituent parts that are the same as in the first exemplary mode of embodiment are given the same reference numerals, and redundant description thereof is forgone. In this example, the major difference from the first exemplary mode of embodiment is the structure for the axial-direction constraint of the permanent magnet 31 by the gear member 32. Specifically, in the first exemplary mode of embodiment, the upper axial-direction constraining part 34*b* is formed in the shape of flanges but, in this example, the outer diameter of the pinion 33 is made larger than the inner peripheral face 31*b* of the permanent magnet 31, such that the outer edge portion of the lower surface of the pinion 33 is used as the upper axial-direction constraining part 34*b*. Note that the elastic pieces 34*d* are arranged in the space provided between the inner peripheral face 31*b* of the permanent magnet 31 and the circumferential-direction constraining parts 34*a*, in the same manner as in the first exemplary mode of embodiment. In this example, the same effect is produced as in of the first exemplary mode of embodiment.

Four exemplary mode of embodiments of the present invention have been described above, but these exemplary modes of embodiment are individual examples of means for carrying out the present invention, and these exemplary modes of embodiment can be modified as appropriate without departing from the gist of the present invention. For example, rather than being a stationary shaft, the shaft 50 may be a rotary shaft that is fixed to the permanent magnet rotor 30 and rotates together with the permanent magnet rotor 30. In this case, the upper bearing 11*a* on the upper case 11 and the lower bearing 12*a* on the lower case 12 are preferably oil impregnated bearings, for example. Further, the number of the circumferential-direction constraining parts 34*a*, upper axial-direction constraining parts 34*b*, lower axial-direction constraining parts 34*c*, and elastic pieces 34*d* in the gear member 32 can be changed as appropriate in accordance, for example, with the number of the polygonal sides of the inner peripheral face 31b of the permanent magnet 31.

What is claimed is:

1. A motor comprising:
   a shaft;
   a permanent magnet rotor in which a permanent magnet and a gear member are united; and
   a stator, arranged facing the permanent magnet,
   wherein the permanent magnet has a cylindrical outer peripheral face and a regular polygonal prismatic inner peripheral face,
   wherein the gear member has:
      a center hole through which the shaft is inserted;
      a pinion positioned in an axially upper part of the shaft; and
      a mounting part positioned in an axially lower part of the shaft,
   wherein the mounting part has:
      a circumferential-direction constraining part, which is in close contact with only a portion of the inner peripheral face of the permanent magnet, so as to constrain the movement of the permanent magnet in the circumferential direction;
      axial-direction constraining parts, which abut both the top and bottom surfaces of the permanent magnet, so as to constrain the movement of the permanent magnet in the axial direction; and
      elastic pieces that apply a radially outward biasing force against the inner peripheral face of the permanent magnet;
   wherein the inner peripheral face of the permanent magnet is distinct from said circumferential-direction constraining part; and
   wherein in a cross section orthogonal to an axial direction of the shaft through the permanent magnet and the mounting part, a circumferential shape of the regular polygonal prismatic inner peripheral face of the permanent magnet is different from a circumferential shape of the circumferential-direction constraining part, so that at least one space is provided between said inner peripheral face of the permanent magnet and said circumferential-direction constraining part with the elastic pieces arranged in said at least one space.

2. The motor according to claim 1, wherein said inner peripheral face of the permanent magnet has a regular polygonal columnar shape with at least six corners;
   wherein the circumferential-direction constraining part is pressed against at least a portion of two surfaces, which are respectively adjacent to two facing corners of said at least six corners of the inner peripheral face of the permanent magnet, and
   wherein a first space is provided between the inner peripheral face of the permanent magnet and the circumferential-direction constraining part, an elastic piece among said elastic pieces being disposed in the first space.

3. The motor according to claim 1, wherein said inner peripheral face of the permanent magnet has a regular polygonal columnar shape with at least six corners,
   wherein the circumferential-direction constraining part is pressed against at least a portion of two facing surfaces of the inner peripheral face of the permanent magnet, and
   wherein a first space is provided between the inner peripheral face of the permanent magnet and the circumferential-direction constraining part, a first elastic piece of said elastic pieces being disposed in the space.

4. The motor according to claim 1, wherein among the axial-direction constraining parts, one of the upper constraining part that constrains the top surface of the permanent magnet and the lower constraining part that constrains the bottom surface of the permanent magnet is provided continuous with an end of an elastic piece among said elastic pieces.

5. The motor according to claim 4, wherein
   a protruding part, which protrudes radially outward, is provided on the lower side of the pinion, and
   at least a portion of the lower surface of the protruding part abuts the top surface of the permanent magnet, so as to constitute the upper constraining part.

6. The motor according to claim 4, wherein at least a portion of the lower surface of the pinion abuts the top surface of the permanent magnet, so as to constitute the upper constraining part.

7. The motor according to claim 1, wherein the axial length of the elastic pieces is within a range of 0.5 to 1.0 times the axial length of the permanent magnet.

8. The motor according to claim 1, wherein in the permanent magnet, N poles and S poles are alternately magnetized in the circumferential direction, and the boundaries between the magnetic poles correspond to the corners of the regular polygonal prism.

9. A motor comprising:
   a shaft;
   a permanent magnet rotor in which a permanent magnet and a gear member are united; and
   a stator, arranged facing the permanent magnet,
   wherein the permanent magnet has a cylindrical outer peripheral face and a regular polygonal prismatic inner peripheral face, wherein N poles and S poles are alternately magnetized in the circumferential direction, and the boundaries between the magnetic poles correspond to the corners of the regular polygonal prism,
   wherein the gear member has: a center hole through which the shaft is inserted; a pinion positioned in an axially upper part of the shaft; and a mounting part positioned in an axially lower part of the shaft,
   wherein the mounting part has: a circumferential-direction constraining part, which is in close contact with only a portion of the inner peripheral face of the permanent magnet, so as to constrain the movement of the permanent magnet in the circumferential direction; axial-direction constraining parts, which abut both the top and bottom surfaces of the permanent magnet, so as to constrain the movement of the permanent magnet in the axial direction; and elastic pieces that apply a radially outward biasing force against the inner peripheral face of the permanent magnet,
   wherein the inner peripheral face of the permanent magnet is distinct from said circumferential-direction constraining part,
   wherein in a cross section orthogonal to an axial direction of the shaft through the permanent magnet and the mounting part, a circumferential shape of the regular polygonal prismatic inner peripheral face of the permanent magnet is different from a circumferential shape of the circumferential-direction constraining part, so that at least one space is provided between said inner peripheral face of the permanent magnet and said circumferential-direction constraining part with the elastic pieces arranged in said at least one space, and wherein among the axial-direction constraining parts, one of the upper constraining part that constrains the top surface of the permanent magnet and the lower constraining part that constrains the bottom surface of the permanent magnet is provided continuous with an end of an elastic piece.

10. An actuator unit in which a motor and a speed reduction mechanism are housed in a case,
wherein the motor comprises: a shaft; a permanent magnet rotor in which a permanent magnet and a gear member are united; and a stator, arranged facing the permanent magnet,
wherein the permanent magnet has a cylindrical outer peripheral face and a regular polygonal prismatic inner peripheral face,
wherein the gear member has: a center hole through which the shaft is inserted; a pinion positioned in an axially upper part of the shaft; and a mounting part positioned in an axially lower part of the shaft,
wherein the mounting part has: a circumferential-direction constraining part, which is in close contact with only a portion of the inner peripheral face of the permanent magnet, so as to constrain the movement of the permanent magnet in the circumferential direction; axial-direction constraining parts, which abut both the top and bottom surfaces of the permanent magnet, so as to constrain the movement of the permanent magnet in the axial direction; and elastic pieces that apply a radially outward biasing force to the inner peripheral face of the permanent magnet,
wherein the inner peripheral face of the permanent magnet is distinct from said circumferential-direction constraining part,
wherein in a cross section orthogonal to an axial direction of the shaft through the permanent magnet and the mounting part, a circumferential shape of the regular polygonal prismatic inner peripheral face of the permanent magnet is different from a circumferential shape of the circumferential-direction constraining part, so that at least one space is provided between said inner peripheral face of the permanent magnet and said circumferential-direction constraining part with the elastic pieces arranged in said at least one space, and
wherein the speed reduction mechanism reduces the speed of the rotation of the pinion.

11. The actuator unit according to claim 10, wherein
the case is formed by assembling an upper case and a lower case, which are made from resin, with each other, and
the shaft is supported by an upper bearing integrally formed with the upper case and a lower bearing integrally formed with the lower case.

12. The motor of claim 1, wherein in a cross section orthogonal to an axial direction of the shaft through the permanent magnet and the mounting part, the circumferential-direction constraining part is in contact with the inner peripheral face of the permanent magnet at only a a first circumferential portion of the inner peripheral face of the permanent magnet, the first circumferential portion spanning less than a complete circumference of the inner peripheral face of the permanent magnet; and
wherein in said cross section said elastic pieces apply a radially outward biasing force against a second circumferential portion of the inner peripheral face of the permanent magnet different from the first circumferential portion of the inner peripheral face of the permanent magnet.

13. The motor according to claim 12, wherein said inner peripheral face of the permanent magnet has a regular polygonal columnar shape with at least six corners, each corner being formed, respectively, by two adjacent portions of the inner peripheral face;
wherein the circumferential-direction constraining part is pressed against said two adjacent portions for each one of two opposing corners of said at least six corners,
wherein the second portion of the inner peripheral face comprises two facing surfaces, a first space provided between the circumferential-direction constraining part and a first one of said two facing surfaces, a second space provided between the circumferential-direction constraining part and a second one of said two facing surfaces, a first elastic piece of said elastic pieces disposed in said first space, and a second elastic piece of said elastic pieces disposed in said second space.

14. The motor according to claim 12, wherein said inner peripheral face of the permanent magnet has a regular polygonal columnar shape with at least six corners;
wherein the circumferential-direction constraining part is pressed against at least a portion of two facing surfaces of the inner peripheral face of the permanent magnet,
wherein a first space is provided between the circumferential-direction constraining part and the inner peripheral face of the permanent magnet and a second space is provided between the circumferential-direction constraining part and the inner peripheral face of the permanent magnet, a first elastic piece of said elastic pieces disposed in said first space, and a second elastic piece of said elastic pieces disposed in said second space.

* * * * *